(12) United States Patent
Chou

(10) Patent No.: US 7,263,658 B2
(45) Date of Patent: Aug. 28, 2007

(54) MULTILINGUAL INPUT METHOD EDITOR FOR TEN-KEY KEYBOARDS

(75) Inventor: Eric Y. Chou, Fremont, CA (US)

(73) Assignee: Charisma Communications, Inc., Fremont, CA (US)

( * ) Notice: Subject to any disclaimer, the term of this patent is extended or adjusted under 35 U.S.C. 154(b) by 391 days.

(21) Appl. No.: 10/977,630

(22) Filed: Oct. 29, 2004

(65) Prior Publication Data

US 2006/0095843 A1 May 4, 2006

(51) Int. Cl.
*G06F 17/00* (2006.01)
(52) U.S. Cl. .................. 715/535; 715/536; 715/816
(58) Field of Classification Search ............... 715/535, 715/536, 816
See application file for complete search history.

(56) References Cited

U.S. PATENT DOCUMENTS

| | | | |
|---|---|---|---|
| 5,952,942 A | 9/1999 | Balakrishnan et al. | 341/20 |
| 6,525,676 B2 | 2/2003 | Kisaichi et al. | 341/22 |
| 6,765,504 B2 | 7/2004 | Ouyang | 341/28 |
| 6,922,811 B1* | 7/2005 | Leung et al. | 715/535 |
| 6,956,968 B1* | 10/2005 | O'Dell et al. | 382/182 |
| 2004/0155882 A1* | 8/2004 | Wu | 345/467 |
| 2006/0007157 A1* | 1/2006 | Li et al. | 345/168 |
| 2006/0170657 A1* | 8/2006 | Lin et al. | 345/171 |

\* cited by examiner

*Primary Examiner*—Stephen Hong
*Assistant Examiner*—Adam M Queler
(74) *Attorney, Agent, or Firm*—Saile Ackerman LLC; Stephen B. Ackerman

(57) ABSTRACT

A system and method is shown that is used to input multilingual text into an electronic device comprising a numerical keypad, or equivalent. The system comprises a language input method editor that accesses a character database. Asian and non-Asian languages can be intermingled within a line of text using the language input method editor and displayed on a text window of the electronic device. Words, or characters, of Asian languages are selected from character databases using a special decimal code of four or more digits and characters of non-Asian languages are selected using a two-digit decimal code. The special decimal code for Asian languages provides a means for alphabetizing all characters of the Asian languages.

17 Claims, 13 Drawing Sheets

FIG. 5A

| 1st\2nd | 1 | 2 | 3 | 4 | 5 | 6 | 7 | 8 | 9 | 0 |
|---|---|---|---|---|---|---|---|---|---|---|
| 1 | A | B | C | D | E | F | G | [ | ] | + |
| 2 | H | I | J | K | L | M | N | ~ | \| | − |
| 3 | O | P | Q | R | S | T | U | V | _ | = |
| 4 | W | X | Y | Z |   |   | Ñ |   |   | % |
| 5 | ! | @ | # | $ | % | ^ | & | * | ( | ) |
| 6 | a | b | c | d | e | f | g |   |   | ^ |
| 7 | h | i | j | k | l | m | n | { | } | $ |
| 8 | o | p | q | r | s | t | u | v |   | * |
| 9 | w | x | y | z |   |   | ñ | < | > | / |
| 0 | . | , | : | ; | ? | ' | " | \ | space | |

FIG. 5B

| 1st\2nd | 1 | 2 | 3 | 4 | 5 | 6 | 7 | 8 | 9 | 0 |
|---|---|---|---|---|---|---|---|---|---|---|
| 1 | Α | Β | Γ | Δ | Ε | Ζ | Ϛ | [ | ] | + |
| 2 | Η | Θ | Ι | Κ | Λ | Μ | Ν | ~ | \| | − |
| 3 | Ξ | Ο | Π | Ρ | Σ | Τ | Υ | Φ | _ | = |
| 4 | Χ | Ψ | Ω | ϑ | ϵ |   |   |   |   | % |
| 5 | ! | @ | # | $ | % | ^ | & | * | ( | ) |
| 6 | α | β | γ | δ | ε | ζ | ϖ |   |   | ^ |
| 7 | η | θ | ι | κ | λ | μ | ν | { | } | $ |
| 8 | ξ | ο | π | ρ | σ | τ | υ | φ |   | * |
| 9 | χ | ψ | ω | ϕ |   |   |   | < | > | / |
| 0 | . | , | : | ; | ? | ' | " | \ | space | |

| 1st\2nd | 1 | 2 | 3 | 4 | 5 | 6 | 7 | 8 | 9 | 0 |
|---|---|---|---|---|---|---|---|---|---|---|
| 1 | ㅂ | ㅁ | ㄷ | ㄴ | ㄹ | ㄱ | ㅈ | ㅅ | ㅎ | ㅇ |
| 2 | ㅍ |  | ㅌ |  |  | ㅋ | ㅊ |  | ~ | ㅣ |
| 3 | ㅃ |  | ㄸ |  |  | ㄲ | ㅉ | ㅆ | _ | ㄹㅎ |
| 4 | ㄹㅂ | ㄹㅇ | ㄹㅌ | ㄹㅍ | ㄹㄱ | ㄱㅅ | ㄴㅈ | ㄹㅅ | ㅂㅅ | ㄴㅎ |
| 5 | ! | @ | # | $ | % | ^ | & | * | ( | ) |
| 6 | ㅏ | ㅗ | ㅜ | ㅓ | ㅐ | ㅔ |  | [ | ] | ^ |
| 7 | ㅑ | ㅛ | ㅠ | ㅕ | ㅒ | ㅖ |  | { | } | $ |
| 8 | ㅟ | ㅢ | ㅘ | ㅝ | ㅙ | ㅚ | ㅞ | + | − | * |
| 9 | ─ |  |  |  |  |  | < | > | / |  |
| 0 | . | , | : | ; | ? | ' | " | \ | space |  |

FIG. 7

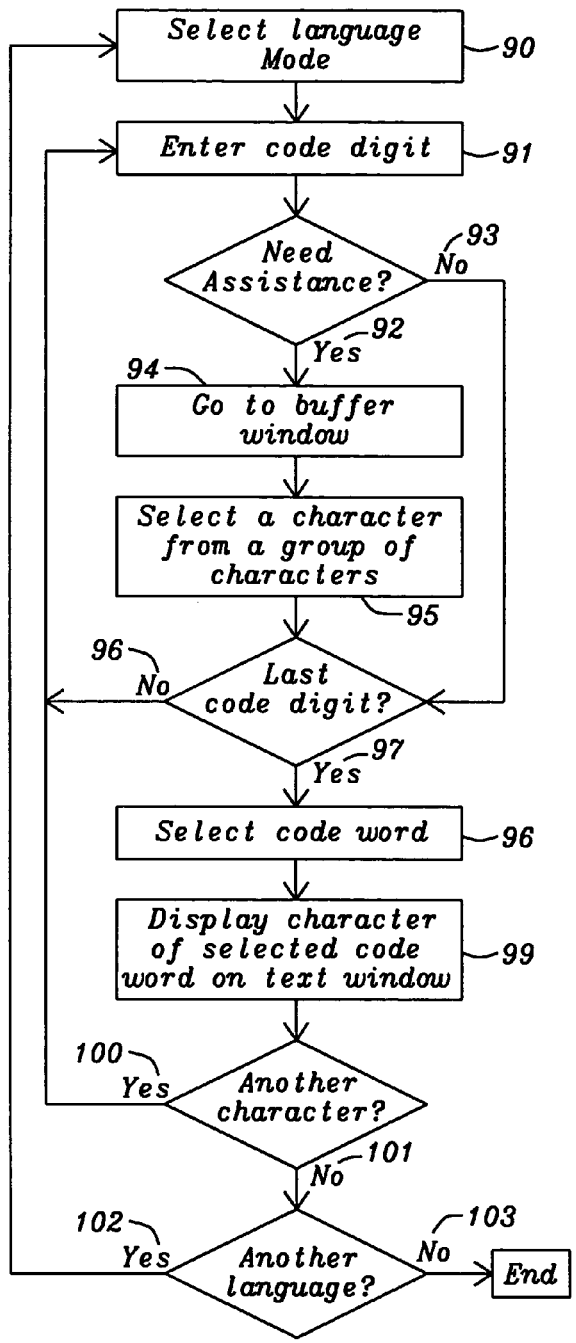
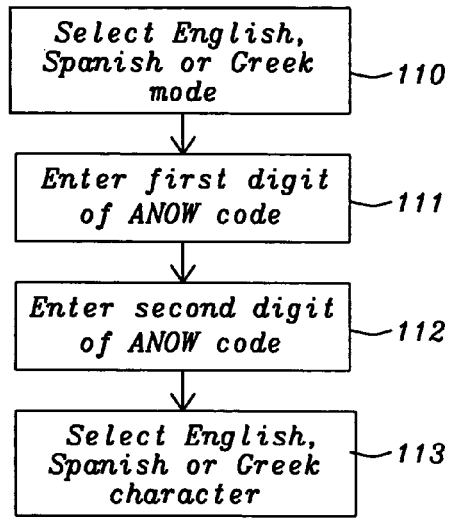
FIG. 9
FIG. 8

MULTILINGUAL INPUT METHOD EDITOR FOR TEN-KEY KEYBOARDS

BACKGROUND OF THE INVENTION

1. Field of Invention

The present invention refers to a method of data entry to an electronic device, and in particular to multilingual text input to an electronic device, which has a ten-key keyboard.

2. Description of Related Art

Today there are a plurality of devices and systems that require data entry by means of a keyboard having a relatively few data entry keys relative to multilingual data input, comprising mobile phones, ATM machines, information appliances, personal data assistants, industrial control key pads, remote control, interactive TV, door security control, calculators, electronic dictionaries, personal computers, air condition control pads, medical devices, electronic control panels, and type-writers. In many cases the keys are used to enter multiple characters of the English language, for example, such as with the telephone.

Text entry in Chinese and derivative languages, such as Japanese and Korean, is difficult with a small number of keys on a typical key board and very difficult using a ten key entry system such as found on a mobile phone. The Chinese language was formed centuries ago in ideograms, or characters. These ideograms were formed from pictures of things that the Chinese people knew. A very simple example is the formation of the ideogram for "east" 202 shown in FIG. 1A for the Chinese language. A symbol for the sun 201 is combined with a symbol for a tree 207, such that the sun is rising behind the tree. Starting with what the ancient Chinese people saw, the sun was drawn by the ancient Chinese people as a circle with a dot in the center 200 and was simplified to a box with a line through the center of the box 201. The tree was originally drawn by the ancient Chinese with an outline of the foliage, a trunk and some roots 206. A modern Chinese version of the tree 207 is a cross like structure with curved line on either side of the post of the cross representing the roots of the tree. The horizontal member of the cross represents the branches of the tree. The symbol for "east" 202 shows the sun rising behind the tree. More recently the modern version of "east" 202 has been modified in the simplified Chinese 203, which loses some of the historical significance pertaining to how the symbol originated. Certainly the "sun", the "tree" and "east" can each be represented by a key but there are thousands of Chinese and derivative language ideograms or characters, which makes use of small keypads to create a text communication very difficult.

In FIG. 1B is shown a second example of how the present day Chinese ideograms developed. The ancient Chinese saw a fish and created an ideogram for a fish 210. This ideogram was simplified in modern Chinese by drawing a box with lines crossing through the box to represent the body of the fish. Above the box rests the head, and below the box four lines symbolize the tail. In simplified Chinese the tail is further simplified to a line. In modern Chinese an ideogram for sound, Zhou, 213 is combined with the ideogram for fish to form a modern Chinese character for snapper fish 214. The simplified Chinese version for the snapper fish 215 replaces the lines representing the tail with a single line.

FIGS. 1A and 1B are very simple examples of the difficulties of people trying to communicate using a keypad entry system developed for the English language while trying to use their native language. There are no keys for sun, tree, east, fish, sound and snapper fish. If there were there would still be no keys for other Chinese characters. As short messaging services becomes more widely used as with a mobile phone, a method is needed to allow an easier usage. The mobile phone presents a difficult device for entry of complex characters and symbols. The small form factor of the mobile phone and the limited keypad is also inconvenient for the entry of text using the English language, which has only 26 characters. Multiple strokes of the same key are required to allow the text entry in the English language, and it is even more difficult and inconvenient for languages such as Chinese.

In various computer applications the input methods for a personal data assistant (PDA) can be different from that of a remote control, for instance. For users of the Asian languages the method of data entry from device to device provides more difficulty. An existing input method for the Chinese language comprising Chang-Jie or DaYi is useful in personal computers but is not very useful in devices with small keypad devices such as mobile phones. This creates a need for a platform independent input method for the Asian languages. Chinese, Japanese and Korean languages have been separately computerized, which has made them not compatible with each other on a modern computer platform even though these languages share a common background due to historical reasons, which can allow them to be unified together.

U.S. Pat. No. 6,765,504 B2 (Yen-I Ouyang et al.) is directed to inputting pinyin symbols using keys "2" through "9" on a numeric keypad so that pinyin symbol combinations can be converted into Chinese characters and words. In U.S. Pat. No. 6,525,676 B2 (Kazuhiro Kiasaichi et al.) a keypad entry of data is directed to the selection of one of a plurality of alphabets distributed to sequentially entered key combinations whereupon character conversion is executed by a dictionary means, wherein the dictionary means stores numeric strings and meaningful characters. U.S. Pat. No. 5,952,942 (Sreeram Balakrishnan et al.) is directed to a method of text entry by activating keys of a keypad where the keys represent various characters and whereupon a dictionary is searched for character combinations that correspond to the keys that are pressed.

The Chinese language has been developed over four thousand years and contains many pieces of historical value in literature, science and engineering; however the Chinese language has difficulty with computerization. There exists a need to create a good human-computing device interface that can help people easily link the Chinese character set with a computing device. There are some input methods and encoding schemes that attempt to provide an ease of entry for the Asian languages, but these have not been very successful. A method is needed that will not only allow easier entry of Asian languages, also be useful with other languages, such as Greek, Russian, Arabic and benefit users of English and other European languages.

SUMMARY OF THE INVENTION

It is an objective of the present invention to provide a method of character entry across languages and across computing platforms and provide a user-friendly interface.

It is also an objective of the present invention to provide a system with fast character indexing and retrieval.

It is further an objective of the present invention to provide a user interface that provides a multiple language input.

It is also further an objective of the present invention to provide small code size to facilitate the use of small electronic devices.

It is still further an objective of the present invention to provide a unique numerical code for Asian languages comprising Chinese, Japanese, Korean and Vietnamese languages.

It is still further an objective of the present invention to provide a unique code for selection of English, Spanish, Greek and other non-Asian languages and the integration of the non-Asian language characters with Asian language characters on a same line of text displayed on an electronic device.

It is also still further an objective of the present invention to provide code that can be used on various electronic and computing devices.

It is yet another objective of the present invention to provide a user interface to allow people to input a word with either partial or complete code.

The present invention provides a method of creating ideograms, or characters, of the Asian languages that are imputed into a computing device with a relatively small keyboard such as a mobile phone. Whereas the method of the present invention described herein concentrates on the small key entry of a mobile phone, the method is also useful for the entry of ideograms into a personal computer (PC) and other electronic devices comprising ATM machines, information appliances, personal data assistants (PDA), industrial control key pads, interactive TV, door security control, electronic dictionaries, air condition control pads, medical devices, and electronic control panels. Also the method of the present invention is useful for the entry of alphanumeric characters of other languages comprising languages such as English, Spanish and Greek, and thereby allowing the languages to work together using a fast data base and an algorithm to integrate the characters of the various languages together.

The present invention uses a numeric keypad to input data. An AHOW code is used for entry of English characters comprising upper case, lower case, punctuation, math, and other useful characters, and a five-star code is used for inputting Chinese characters and other Asian language characters. The five star code includes five basic code digit, where the digits in a specific order as follows are named Consonant, Rhyme, Intonation, Shape and Unit. There are twenty-one consonants in Chinese, thirty-six rhymes, five intonations, ten groupings of shapes of characters, and ten groupings of units. The rhyme is further divided into four major sound groups comprising open (開口呼), short (齊口呼), close (合口呼) and curve (撮口呼). Unlike consonant, rhyme, intonation and shape, which are assigned to a single ten-digit decimal code, the unit code can have a plurality of ten-digit decimal codes to identify a specific character. One ten-digit decimal code for unit appears capable of covering approximately three thousand characters in the Chinese language. Two ten-digit decimal codes for unit appears sufficient to cover the approximate six thousand high school level Chinese character set, but there are many more characters that exist in the Chinese language. In order to include these character that are beyond the basic high school level character set, additional unit decimal code digits are required.

For the Japanese language, which is derived from the Chinese language, separate modes are reserved for Hiragana and Katakana, which have more than fifty symbols that cannot be combined into one table and are usually used for different words and phrases. When Kanji is to be entered, the Hiragana code is the selected input mode, and the Kanji is found using shape-unit as with the Chinese mode. In like manner, a separate mode is reserved for Korean Hangul from which Korean Hanja characters are imputed into an electronic device using a ten-digit decimal keypad.

The five-star code is a fast and efficient code for alphabetizing and accessing the character databases of the Asian languages, comprising Chinese, Japanese, Korean, Taiwanese and Vietnamese. Unlike the Western languages, comprising English, Spanish and Greek, the Asian character sets are not alphabetized. The words of the English language, for example, grew in number, size and content over many years in a somewhat haphazard fashion, adding words and meaning as the words came into existence. However, because the English language is based on a character set of twenty-six letters plus a few characters for punctuation and other usages, the English words are easily alphabetized. This is not the case with Chinese and the Asian words, which are founded on ideograms (pictures) drawn many centuries ago by the ancient Chinese people to which new words, meaning and diversity were added over the intervening centuries. The problem associated with digitizing the Asian languages can be partially understood by comparing a digital byte for each letter of a word for the Western languages to five or more decimal digits needed in the five-star editor system to identify an Asian character or word.

The efficiency of the five-star code to quickly retrieve an Asian character from a database of characters promotes a new method of grouping Asian characters in an "alphabetical" way. The organizing of the Asian characters in some quasi orderly form has relied on the groupings by diversity, meaning, appearance, or attempts to create a character entry and retrieval system using electronic equipment developed for use with the Western languages; whereas, the words of the Western languages are alphabetized by letter from a defined number of letters and using that same letter set over and over again for subsequent letters in a word to organize the word in an alphabetical listing, called a dictionary. The five-star code of the present invention provides a means for alphabetizing the Asian characters in an efficient and orderly way using consonant, rhyme, intonation, shape and unit of the five-star editing system in explicitly the order of consonant, rhyme, intonation, shape and unit as defined herein. This alphabetizing of the Asian languages is called herein the "Five-Star Chinese Alphabet" for the Chinese language, and by substituting names of other Asian languages comprising Japanese, Korean, Taiwanese, and Vietnamese for Chinese provides a name for the alphabetizing of those languages, for example: Five-Star Japanese Alphabet, Five-Star Korean Alphabet, Five-Star Taiwanese Alphabet, Five-Star Vietnamese Alphabet and Five-Star Asian Alphabet.

Equally important to providing an alphabetization of the Asian languages, the definition and methodology of the five-star code provides a means by which all written material whether it be on paper or on non-paper material can be stored, categorized, indexed and retrieved in an orderly fashion by digital means or by physical means such as is found in dictionaries and libraries. The speed by which a system using the five-star methodology can access the Asian character set allows the multitude of written Asian material to be shared universally and not just by scholars that have access and are adept at the understanding of the entire Asian character set. Searching a database, for example, of Asian literature using the five-star code methodology would provide an efficient retrieval and sharing of documents and facilitate the sharing of ideas. Further the five-star code methodology is applicable across computing platforms from a handheld device to a personal computer to larger computing systems comprising servers, mainframes and supercomputers.

BRIEF DESCRIPTION OF THE DRAWINGS

This invention will be described with reference to the accompanying drawings, wherein:

FIG. 5A is a table of English and Spanish characters using the AHOW code scheme, FIG. 5B is a table of Greek characters using the AHOW code scheme, FIG. 7 is a diagram of Hangul characters for the Korean language of the present invention, FIG. 8 is a flow diagram of a method of the present invention for entering language characters using a ten-digit keypad, FIG. 9 is a flow diagram of a method of the present invention for entering English, Spanish or Greek characters.

DETAILED DESCRIPTION OF THE PREFERRED EMBODIMENT

Figure 1A:
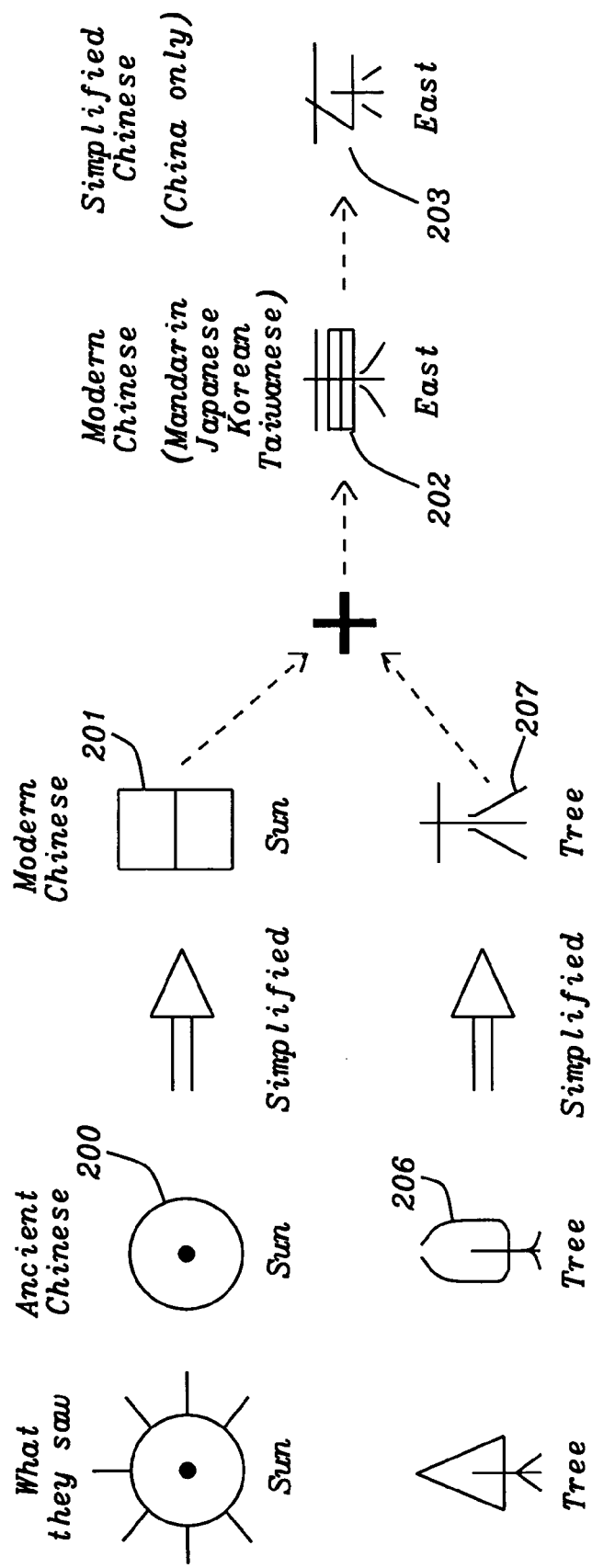
FIGS. 1A and 1B are simple examples of the historical formation of a Chinese ideogram.
Figure 1B:
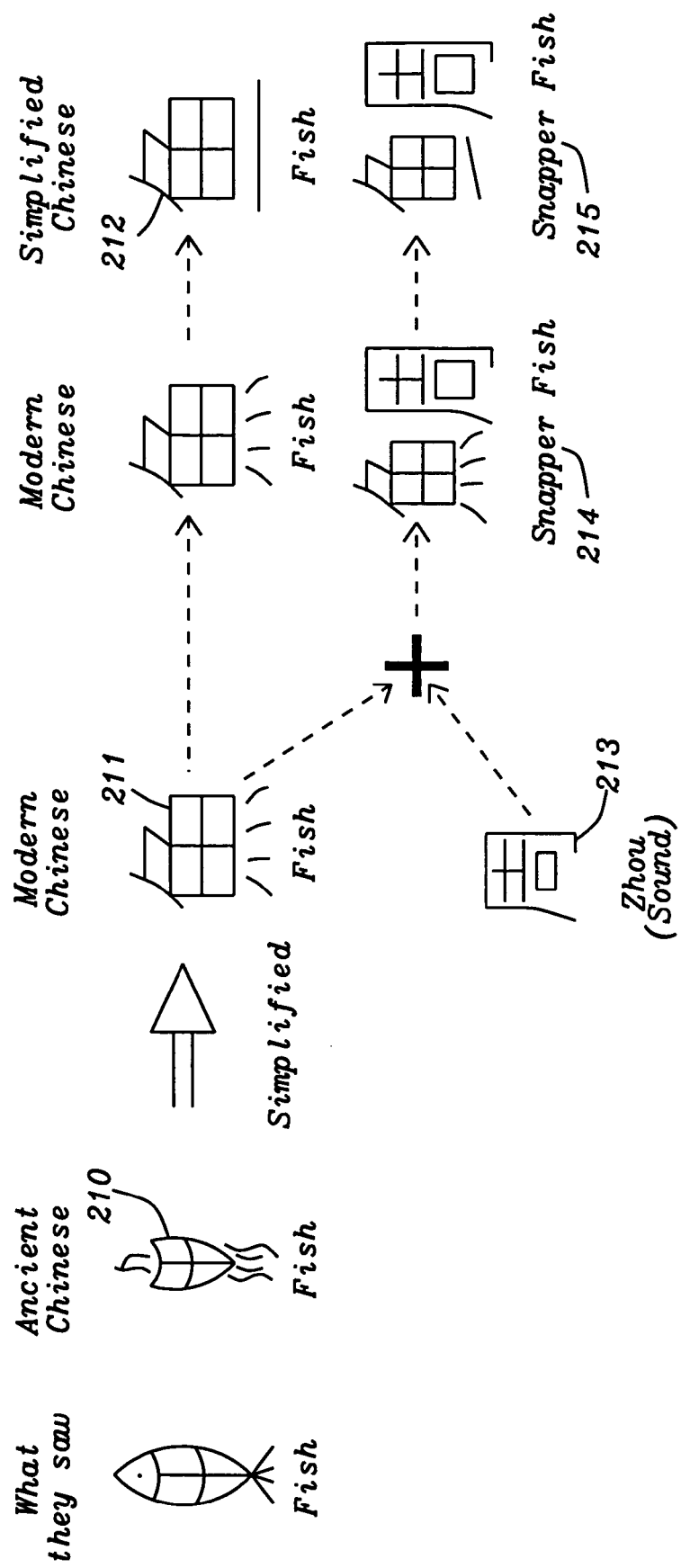
Figure 2:
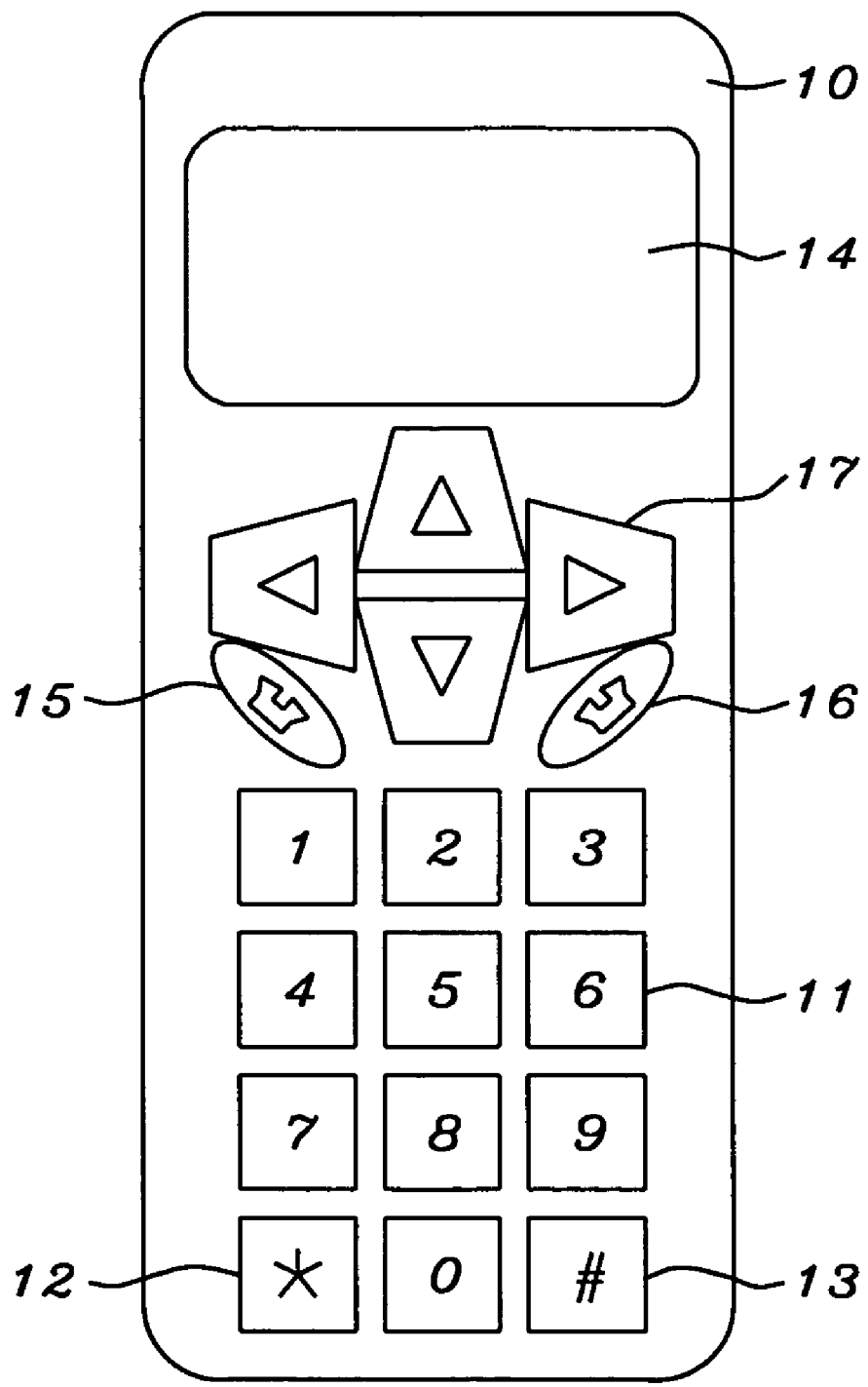
FIG. 2 is a diagram of a mobile phone of the present invention.

In FIG. 2 is shown a mobile phone 10 that is an example of an electronic communicating device, which contains a twelve key keypad 11 of which ten keys are used to enter numbers and text, "0" to "9", and two keys "*" 12 and "#" 13 that are used to select an input mode and select a review display on the screen 14. When the "*" key 12 is pressed the system contained within the mobile phone 10 switches entry modes, and when the "#" key 13 is pressed the display screen 14 changes to a review window to allow a code to be entered by a visual selection of a language character comprising English, Spanish, Greek and Chinese or derivative language characters such as Japanese, Korean and Vietnamese characters. The mobile phone device also has a select key 15 for selecting a character, an exit key 16, and cursor control keys 17 for moving the cursor that is displayed on the screen 14.

The electronic device 10 contains a Language Input Method Editor (LIME) that facilitates the entry of English, Spanish or Greek using a two digit AHOW code, a five digit Five-Star code for entry of Chinese characters and a two-digit code for entry of Japanese characters. The Japanese characters are entered from either a Hiragana code table or a Katakana code table. Korean characters are entered from either a Hanja code table or a Hangul code table. When the "*" mode key 15 is pressed the system switches between modes so that a text entry can contain a mixture of characters form the various languages that are contained within the electronic device. It should be noted that the present invention concentrates on Asian, English, Spanish and Greek languages, but other languages, comprising European, Russian, Arabic and Hindu, can be implemented in a similar fashion. It further should be noted that the method describe for a small input device such as the mobile phone 10 can be implemented for a plurality of electronic devices having a ten digit entry keypad.

Figure 3:
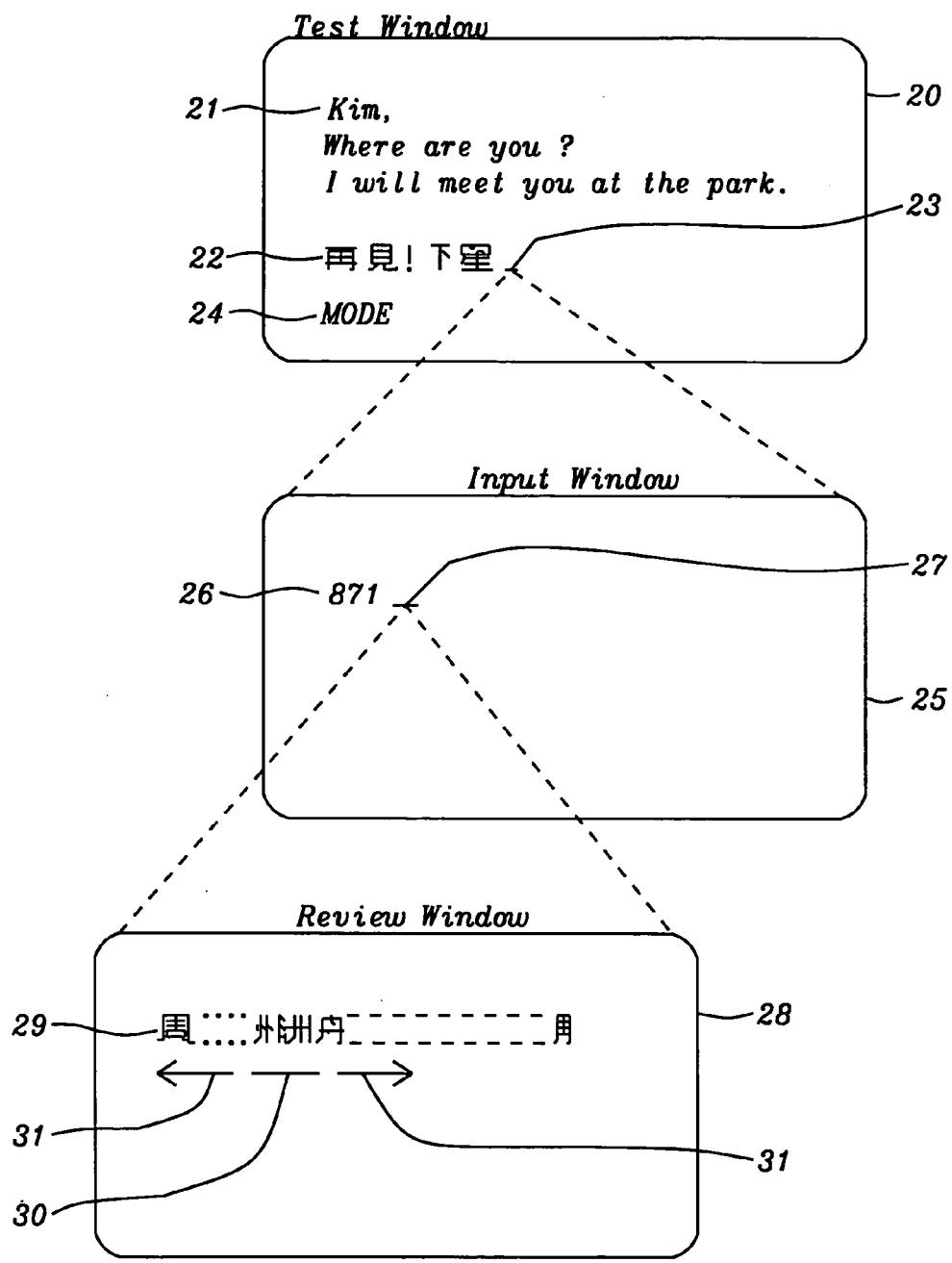
FIG. 3 is a diagram of the present invention showing multiple windows used to select an ideogram.

FIG. 3 shows a diagram for selection and entry of code to produce a text entry on the display screen 14 (FIG. 2). On the text window 20 is displayed words of the English language 21 that have been entered from the AHOW code using the LIME editor and a line of Chinese characters 22 that have been entered followed by a cursor 23. At the position of the cursor 23, an entry mode, which is indicated by the mode indicator 24, can be selected by pressing the "*" key 12 (FIG. 2), and then an input window 25 is displayed. The mode indicator 24 displays a character or combination of characters to indicate the language mode that has been selected, for example A=American alphanumerical comprising English, Spanish, punctuation and numbers, C=simplified Chinese, G=Greek letters, JH=Japanese Hiragana, JK=Japanese Katakana, KJ=Korean Hanja, KG=Korean Hangul, N=numerical and T=traditional Chinese.

Continuing to refer to FIG. 3, a partial five-star Chinese code (871) in decimal form is displayed waiting for the next digit of the five-star code at the position of the cursor 27. By pressing the "#" key 13 (FIG. 2), a review window 28 is displayed. The review window contains a selection of characters 29 representing partial code word 26 with a cursor 30 positioned underneath one of the characters. The cursor is moved 31 by using the cursor control keys 17 (FIG. 2) and when the correct partial code word character is found, the user selects the partial code word character by pressing the select key 15 (FIG. 2), and the next digit of the five-star code is entered onto the input window 25. The "#" key 13 can again be pressed, or a decimal digit can be directly entered, to select a partial code word number is selected. When the five-star code is completed, the a character selected by the five-star code is entered at the cursor position 23 of the text window 20 and the cursor 23 shifts one character to the right awaiting the next entry by the user.

Continuing to refer to FIG. 3, if the user understands the coding scheme of the LIME editor, all or any of the five decimal digits can be entered on the input window 25. If the user is unfamiliar with the coding scheme or needs help selecting a partial code word, pressing the "# " key 13 displays the review window 28 so that a visual selection can be made. If a character cannot be found on the review window 28 that satisfies the users intent, the exit button 16 (FIG. 2) can be pressed to take the user back to the input window where a modification of the partial code word 26 can be made to allow another selection display on the buffer window 28. At any time after a character has been selected and displayed on the text window 20, the character mode 24 can be changed to English, Greek, Japanese, Korean or any other character set that is provided by the LIME editor. This allows words or characters from other character sets to be intermingled with the Chinese characters, for example, English words or Greek symbols.

Figure 4A:
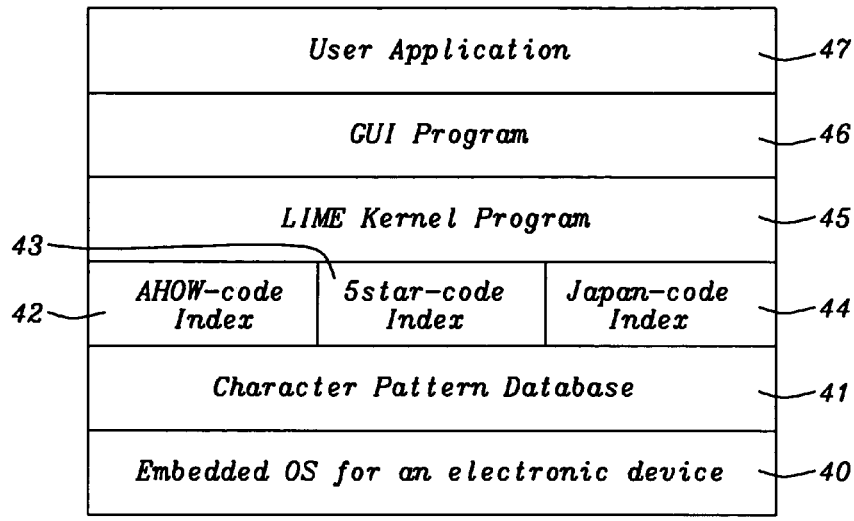
FIG. 4A is an architectural diagram of the system of the present invention.

FIG. 4A shows the basic architecture of the window environment and the underlying database for LIME (language-input-method-editor). Riding on top of the embedded operating system (OS) 40 for an electronic device, such as a mobile phone, is a character pattern database 41. Indexes for the character pattern database 41 are shown in FIG. 4A to comprise of AHOW code 42, five-star code 43 and Japanese code 44. It should be noted that this is an example and other character databases along with the appropriate indexes can be included in the LIME editor system. A LIME kernel program 45 controls the operation of the LIME editor and interfaces between the general user interface (GUI) 46 and the various indexes 42, 43 and 44 to allow retrieval of a character from the character pattern database 41. Interfacing with the GUI 46 is a user application 47, which is text messaging using a mobile phone for the examples discussed in the present invention. However, it should be noted that the methodology discussed herein is not limited to mobile phones and the LIME editor system can be efficiently used with a PC as well as other electronic devices, which contain at least a 10 key keypad, or other minimal data entry such as with a PDA.

Figure 4B:
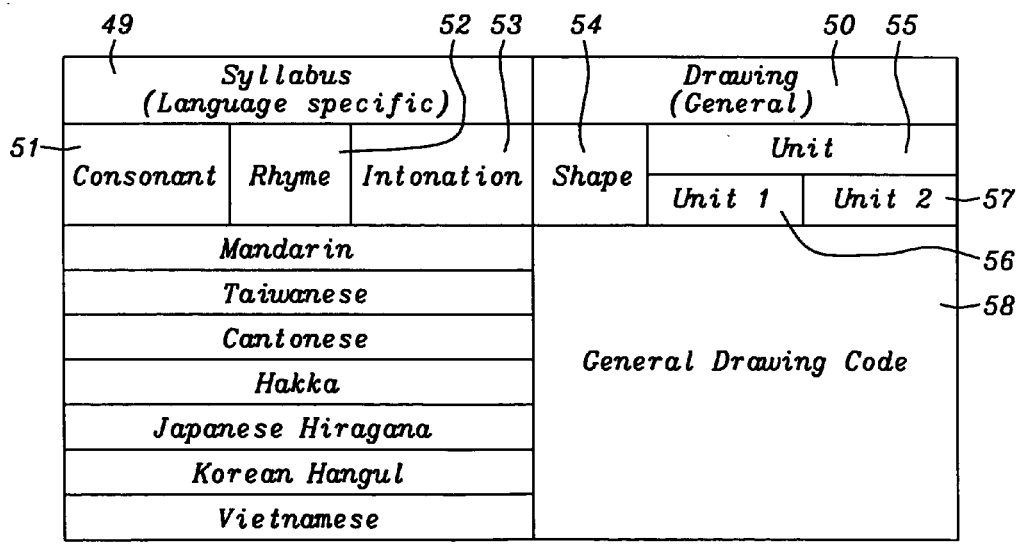
FIG. 4B is a diagram of the present invention of the code architecture for the five-star code used for Asian languages.

In FIG. 4B is a diagram showing the five-star code architecture used by the LIME editor system. The code architecture is divided into two sections, syllabus 49 and drawing 50. The five-star code comprises consonant 51, rhyme 52, intonation 53, shape 54 and unit 55, and is entered into the LIME editor system in the specific order of consonant, rhyme, intonation, shape and unit to retrieve an ideogram from the character database 41 (FIG. 4A). The unit 55 is further divided into unit "1" 56 and unit "2" 57. Ideograms of are retrieved from the character database by first defining a consonant 51 of the ideogram (character or word), then the rhyme 52, then an intonation 53, then by the shape of the ideogram and then by a unit. Unit "1" and unit "2" provide the capability to handle the approximate six thousand high school level characters of the Chinese language. The unit can be expanded to include a unit "3", a unit "4" and additional units as needed to be able to define a unique code for all ideograms of the Chinese and other Asian languages. The Asian languages comprise Japanese Hiragana, Korean Hangul, Vietnamese and Chinese, of which Chinese further comprises Mandarin, Taiwanese, Cantonese, and Hakka, In FIG. 5A is shown an AHOW table for English and Spanish characters that is used by the LIME editor system. A first decimal number 60 ranging from "0" to "9" selects a row in the AHOW table and a second decimal number 61 ranging from "0" to "9" selects a column in the AHOW table. The AHOW table is divided into uppercase characters 62, lower case characters 63, math characters 64, punctuation characters 65 and other useful characters 66 such as "$". The other useful characters 66 are those that require a shift to activate on a standard computer keyboard. Included in the table of English characters are "Ñ" (character number 47 on the AHOW table) and "ñ" (character number 97 on the AHOW table) to accommodate the entry of Spanish words.

In FIG. 5B is shown an AHOW table for Greek characters that is constructed similar to that of the AHOW table for English and Spanish shown in FIG. 5A, but using Greek characters in place of the English characters. A first decimal number 60 ranging from "0" to "9" selects a row in the AHOW table and a second decimal number 61 ranging from "0" to "9" selects a column in the Greek AHOW table. The Greek AHOW table is divided into uppercase characters 62, lower case characters 63, math characters 64, punctuation characters 65 and other useful characters 66 such as "$". The other useful characters 66 are those that require a shift to activate on a standard computer keyboard.

It should be noted that although the AHOW tables shown in FIG. 5A and FIG. 5B have a particular organization, any other organization could be used with the LIME editor system. The AHOW tables of the present invention are organized in a particular way to assist the user in locating a character and remembering where a character is located.

Since the Chinese character set is very large, the LIME architecture requires a special coding called five-star code. Japanese and Korean languages also use the Chinese characters, which increases the importance of the special coding of the Chinese character set. To select Chinese characters, the LIME architecture uses the five-star code, which contains five to six or more decimal digits in a specific order, each digit ranging from "0" to "9". The digits of the specific order are named consonant, rhyme, intonation, shape, and unit, and listed in the order that they must be used. Each element has one digit except that the unit may have one or more digits. The code structure is shown in FIG. 4B. These five elements can be grouped into two separate sections: syllabus and drawing. The syllabus section contains of three elements: consonant, rhyme and intonation, and the syllabus section is language-specific in which Chinese and Chinese dialect may have their own code assignments. In the present invention, the presentation is made based on the mandarin Chinese. Japanese and Korean languages and may have their own syllabus section. The drawing section contains two elements: shape and unit. Hiragana and Katakana are both included in this invention as two separate modes (JH and JK), and a third mode for Kanji (JC) can be added. Hiragana is used for the input keys and Kanji characters can be the output. Korean Hangul is in similar situation as Hiragana and Hanji is similar to Kanji. The drawing section is general among these East Asian Languages.

The first digit of the five-star code is consonant. There are twenty-one consonants in the Chinese language. The twenty-one consonants are grouped into 10 groups, an example of which is shown in TABLE 1A and TABLE 1B. It should be noted that TABLE 1A and 1B show an example of the assignment of Chinese characters to the ten digit numbers of a keypad and any other assignment configuration is within the scope of the present invention.

TABLE 1A

| ㄅㄆ | ㄇㄈ | ㄉㄊㄋ |
|---|---|---|
| 1 | 2 | 3 |
| ㄌㄖ | ㄍㄎㄏ | ㄓㄔ |
| 4 | 5 | 6 |
| ㄑㄐㄒ | ㄗㄘㄙ | ㄧ |
| 7 | 8 | 9 |
| * | 〔ㄨ〕0 | # |

TABLE 1A is formed into the shape of a twelve key keypad with number keys from "1" through "0". The Chinese characters that are associated with each number key are part of the twenty-one consonants. When either "ㄅ" or "ㄆ" are found as a consonant of a word, the number "1" on the keypad is pressed to select the consonant. When either "ㄇ" or "ㄈ" are the consonant, the number "2" key is pressed to select the consonant. The number "3" key is pressed to select either "ㄉ", "ㄊ" or "ㄋ" as the consonant, the number "4" key is pressed to select either "ㄌ" or "ㄖ" the number "5" key is pressed to select "ㄍ", "ㄎ" or "ㄏ" as the consonant, the number "6" key is pressed to select "ㄓ" or "ㄗ" as the consonant, the number "7" key is pressed to select "ㄑ", "ㄔ" or "ㄘ" as the consonant, the number "8" key is pressed to select "ㄕ","ㄙ" or "ㄒ" as the consonant, and the number "9" key is pressed to select "ㄐ" as the consonant. The number "0" key denoted with an "[X]" and is for Chinese characters that have a leading vowel such is the case in the English words "ant" and "owl". The "*" key represents the mode key and the "#" represents a review key, which accesses the review window of the present invention.

TABLE 1B

| BP | MF | DTN |
|---|---|---|
| 1 | 2 | 3 |
| LR | GKH | Z |
| 4 | 5 | 6 |
| CQ | SX | J |
| 7 | 8 | 9 |
| * | [X] | # |
|   | 0 |   |

TABLE 1B is formed into the shape of a twelve key keypad with number keys from "1" through "0", which is associated with the Pinyin system for simplified Chinese and which provides an entry for consonants of the simplified Chinese. Key "1" (representing Chinese consonants ㄅand ㄆ) selects consonant words (words starting with a consonant) having sounds as might be used with the letters "B" and "P". Key "2" (representing consonants ㄇ and ㄈ) selects consonant words having sounds as might be used with the letters "M" and "F". Key "3" (representing consonants ㄉ, ㄊand ㄋ) selects consonant words having a sound as might be used with the letters "D", "T" and "N". Key "4" (representing consonants ㄌand ㄖ) selects consonant words having sounds as might be used with the letters "L" and "R". Key "5" (representing consonants ㄍ,ㄎand ㄏ) selects consonant words having a sound as might be used with the letters "G", "K" and "H". Key "6" (representing consonants ㄓand ㄗ) selects consonant words having a sound as might be used with the letter "Z". Key "7" (representing consonants ㄑ,ㄔ and ㄘ) selects consonant words having a sound as might be used with the letters "C" and "Q". Key "8" (represents consonants ㄕ,ㄙ and ㄒ) selects consonant words having a sound as might be used with "S" and "X". Key "9" (representing consonant ㄐ) selects consonant words having a sound as might be used with the consonant "J". Key "0" as identified with an "[X]selects no consonant Chinese words.". The "*" represents the mode key and the "#" represents a review key, which access the review window of the present invention.

The second digit of the five-star code is rhyme. There are thirty-six rhymes in the Chinese language, and the rhymes are grouped into ten rhyme groups as shown in TABLE 2A and TABLE 2B. In the Chinese language a same sound ending of a character with different middle vowels are grouped into four major sound groups named "open, short, close and curve". In TABLE 2A the rhymes of similar sound are grouped together with a designated keypad number, except for "i (—)" assigned to keypad "1", "u (ㄨ)" assigned to keypad "2" and "yu (ㄩ)" assigned to keypad "3". For example, there may be different rhymes of "an (ㄢ)", "ian (—ㄢ)", "uan(ㄨㄢ)", and "yuan (ㄩㄢ)", which are all combined as the same rhyme that has the same rhyme code number "8 (ㄢ)" as their code digit.

TABLE 2A

| — | ㄨ | ㄩ |
|---|---|---|
| 1 | 2 | 3 |
| ㄚㄛ | ㄜㄝ | ㄞㄟ |
| 4 | 5 | 6 |
| ㄠㄡ | ㄢ | ㄣ |
| 7 | 8 | 9 |
| * | ㄤㄥㄦ | # |
|   | 0 |   |

TABLE 2A is formed into the shape of a twelve key keypad with number keys from "1" through "0". The "*" key represents the mode key and the "# " represents the review window key of the present invention. The Chinese characters that are associated with each number key are part of the thirty-six rhymes. When "—"is the rhyme, key "1" is selected, when "ㄨ"is the rhyme, key "2" is selected, and when "ㄩ"is the rhyme, key 3 is selected. Key "4" is selected for rhymes associated with "ㄚ" or "ㄛ",key "5" is selected for rhymes associated with "ㄜ"or "ㄝ",key "6" is selected for rhymes associated with "ㄞ"or "ㄟ",key "7" is selected for rhymes associated with "ㄠ"or "ㄡ",key "8" is selected for rhymes associated with "ㄢ",key "9" is selected for rhymes associated with "ㄣ",and key "0" is selected for rhymes associated with "ㄤ","ㄥ"or"ㄦ".

TABLE 2B is formed into the shape of a twelve key keypad with number keys from "1" through "0", which is associated with the Pinyin system for simplified Chinese and which provides an entry for rhymes of the simplified Chinese. The "*" key represents the mode key and the "#" represents the review window key of the present invention. The Chinese characters that are associated with each number key are part of the thirty-six rhymes. Key "1" (representing Chinese rhyme —) selects a rhyme related to the sound for the letter "i". Key "2" (representing Chinese rhyme ㄨ) selects a rhyme related to the sound for the letter "u". Key "3" (representing Chinese rhyme ㄩ) selects a rhyme related to the sound for the letters "u, (yu) and [ü]". Key "4" (representing Chinese rhyme ㄚ and ㄛ) selects a rhyme related to the sound for the letters "a", "ia", "ua", "o" and "uo". Key "5" (representing Chinese rhymes ㄜand ㄝ) selects a rhyme related to the sound for the letters "e", "ie" and "üe". Key "6" (representing Chinese rhymes ㄞand ㄟ) selects a rhyme related to the sound for the letters "ai", "uai", "ei" and "ui". Key "7" (representing Chinese rhymes ㄠand ㄡ) selects a rhyme related to the sound for the letters "ao", "iao", "ou" and "iu". Key "8" (representing Chinese rhyme ㄢ) selects a rhyme related to the sound for the letters "an", "ian", "uan", and "Üan". Key "9" (representing Chinese rhyme ㄣ) selects a rhyme related to the sound for the letters "en", "in", "un" and "ün">>. Key "0"

(representing Chinese rhymes ㄤ, ㄥ and ㄦ) selects a rhyme related to the sound for the letters "ang", "iang", "uang", "eng", "ing", "ung", "ong", "iong", and "er". The term "er" is a notation that there are few Chinese words that have a rhyme with the elements of key "0".

TABLE 2B

| i | u | u (yu) [ü] |
|---|---|---|
| 1 | 2 | 3 |
| a ia ua o uo | e ie üe | ai uai ei ui |
| 4 | 5 | 6 |
| ao iao ou iu | an ian uan üan | en in un ün |
| 7 | 8 | 9 |
| * | ang iang uang<br>eng ing ung ong<br>iong er | # |
|   | 0 |   |

Intonation is the third code digit of the five-star consonant-rhyme-intonation-shape-unit code word. Intonation is the rise and fall in the pitch of the voice in speech. In Mandarin Chinese there are five different intonations. TABLE 3 shows the relationship of the keys of a keypad and the Chinese terminology for their intonations.

TABLE 3

| 一聲 | 二聲 | 三聲 |
|---|---|---|
| 1 | 2 | 3 |
| 四聲 |   |   |
| 4 | 5 | 6 |
| 7 | 8 | 9 |
|   | 輕聲 |   |
| * | 0 | # |

TABLE 3 is organized in the form of a 12 key keypad where key "1" is associated with the first intonation "一聲", key "2" is associated with the second intonation "二聲", key "3" is associated with third intonation "三聲", and key "4" is associated with the fourth intonation "四聲" and key "0" is associated with the fifth intonation "輕聲" and is assigned to key "0" for easy remembrance. The "*" key represents the mode key and the "#" represents the review window key of the present invention.

Figure 6A:
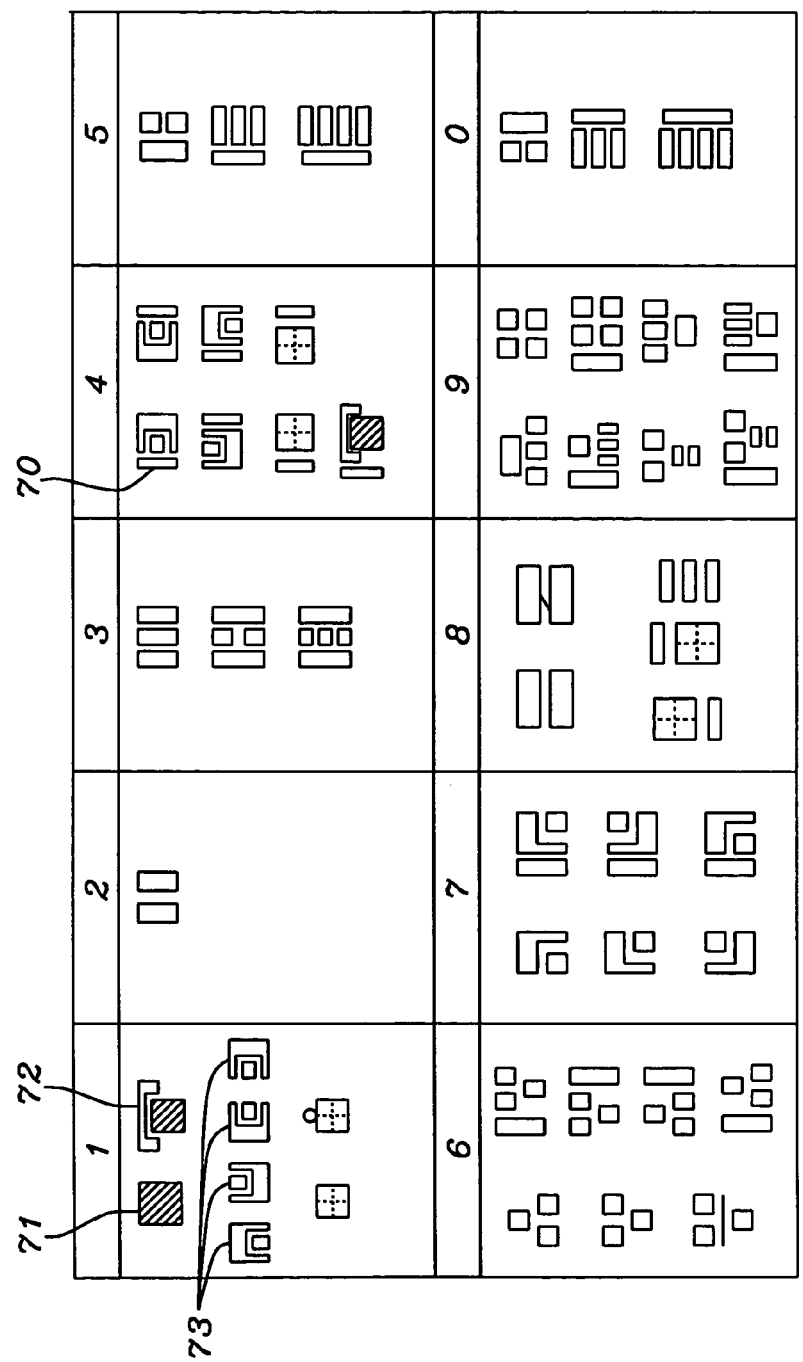
FIG. 6A is a diagram of the fundamental shapes of Chinese characters of the present invention.

Shape is the fourth code digit of the five-star consonant-rhyme-intonation-shape-unit code word. The Chinese character is divided into ten word-shape characteristic as shown in FIG. 6A. Each group of shapes shown is headed by a number, which is the number entered as a fourth digit into the five-star code. The first group associated with the code number "1" of the fourth digit of the five-star code has a shape containing a single body, or structure with and with out a cover 72. The crosshatched box 71 represents any single bodied character, for example "一" meaning one, "東" meaning east, "中" meaning center. The cover 72 can be seen in the character for home "家" which has a cover 72 "宀" over the character for pig "豕", which means "some pigs covered by a safe cover." The four characters 73 located in the middle of the box for code number "1" appear to be multi-bodied but they are characters of a single column, for example "巨" meaning giant and "區" meaning district. The second shape group associated with the code number "2" contains two pieces of a Chinese word that are separated horizontally, for example the character for double "双". The third shape group associated with the code number "3" contains three pieces of a Chinese word that are separated horizontally, for example the character for river "川". The fourth shape group associated with the code number "4" contains a plurality of pieces of a Chinese word in which a "stroke" is encircled on all four sides 70, for example "國" meaning country. Stroke is a term that relates to how a Chinese word is drawn when writing the word by hand. The fifth shape group associated with code number "5" contains one piece of a word on the left and two pieces on the right, or one piece on the right and two pieces on the left, for example the character for love "仁". The sixth shape group associated with the code number "6" has a triangle like structure, which contains one piece of a Chinese word on top and two pieces of the word below the top piece or two pieces of the word on top and one piece of the word below the two top pieces, for example the character for six "六". The seventh shape group associated with the code number "7" contains Chinese words in which there is a bent stroke at one corner of the word, for example the character for windshield "屏". The eighth shape group associated with the code number "8" contains two or more parts of a Chinese word that are separated vertically such that one part is over a second part, for example the character for bath tub "呂". The ninth shape group associated with the code number "9" is used for any Chinese word that does not fit the definition for the other groups, for example the character for random "雜". The tenth shape group associated with the code number "0" is used for a Chinese word that has a shape group "8" to the left and a shape group "1" to the right, for example the character for age "齡". The rules associated with shape of the Chinese word (character) are basic and are applied to all Chinese characters without exception. If the rules associated with groups "2", "4", "5", "6", "7", "9" and "0" contradict each other then the following order of rules are taken "0", "9", "4", "6", "7", "5" and "2" to resolve the contradiction.

TABLE 4

| Code | Category |
|---|---|
| 1 | Words with a vertical line in the center |
| 2 | Complicated words |
| 3 | Words with a three-way fence |
| 4 | Words with a four-way fence |
| 5 | Words with a flat ceiling |
| 6 | Words with a dot and slides on top |
| 7 | Words with a "+" in the middle |
| 8 | Breaking words |
| 9 | Words with a curved bottom |
| 0 | Words with a dot and words with an "×" at bottom |

In TABLE 4 is shown a code table for the unit code, which is the fifth element of the five-star consonant-rhyme-intonation-shape-unit code word. The unit code element can be a plurality of decimal digits each of which use the definitions listed in TABLE 4. The unit code digit "1" relates to words with a vertical line in the center, for example characters 丨, 忄, 卜, 刂, 中, 亻, 亅, 巾, 丁, 子, 扌, 讠, 月, 片 and 寸. The unit code digit "2" relates to complicated words, for example characters 耳, 卩, 多, 犭, 豕, 身, 羊, 牛, 牙, 龜, 鳥, 馬, 長, 艮, and 車. The unit code digit "3" relates to words with a three way fence, for example characters 山, 冂, 月, 匚, 凵, 臼, 冃, 刀, 力, 甘, 舟, ヨ and 爪. The unit code digit "4" relates to words with a four way fence, for example characters 四, 口, 囗, 田, 且, 白, 國, 皿, 甲, 由 and 丘. Unit code digit "5" relates to words with a flat ceiling, for example characters 五, 下, 王, 玉, 干, 工, 不, 石, 一, 二 and 三. The unit code digit "6" relates to words with a dot and slides on top, for example characters 亠, 文, 立, 方, 竹, 士, 土, 上, 止, 生 and 主. The unit code digit "7" relates to words with a 十 in the middle, for example characters 七, 十, 千, 丰, 木, 米, 廾, 廿, 卅, 冊, 禾, 東, 束 and 乗. The unit code digit "8" relates to breaking words, for example characters 八, 小, 儿, ソ, 灬, 爫, 艹非, 巛 and 彡. The unit code digit "9" relates to words with a curved bottom, for example 九, 乚, 乙, 匕, 心, 巴, 己, 巳, 走, 疋, 兆, 尢, 尤, 之, 兀 and 毛. The unit code digit "0" relates to words with a dot and words with an X at the bottom, for example 丶, 丿, 冫, 氵, 人, 乂, 大, 入, 又, 欠, 夂, 戈, 史 and 更.

Figure 6B:
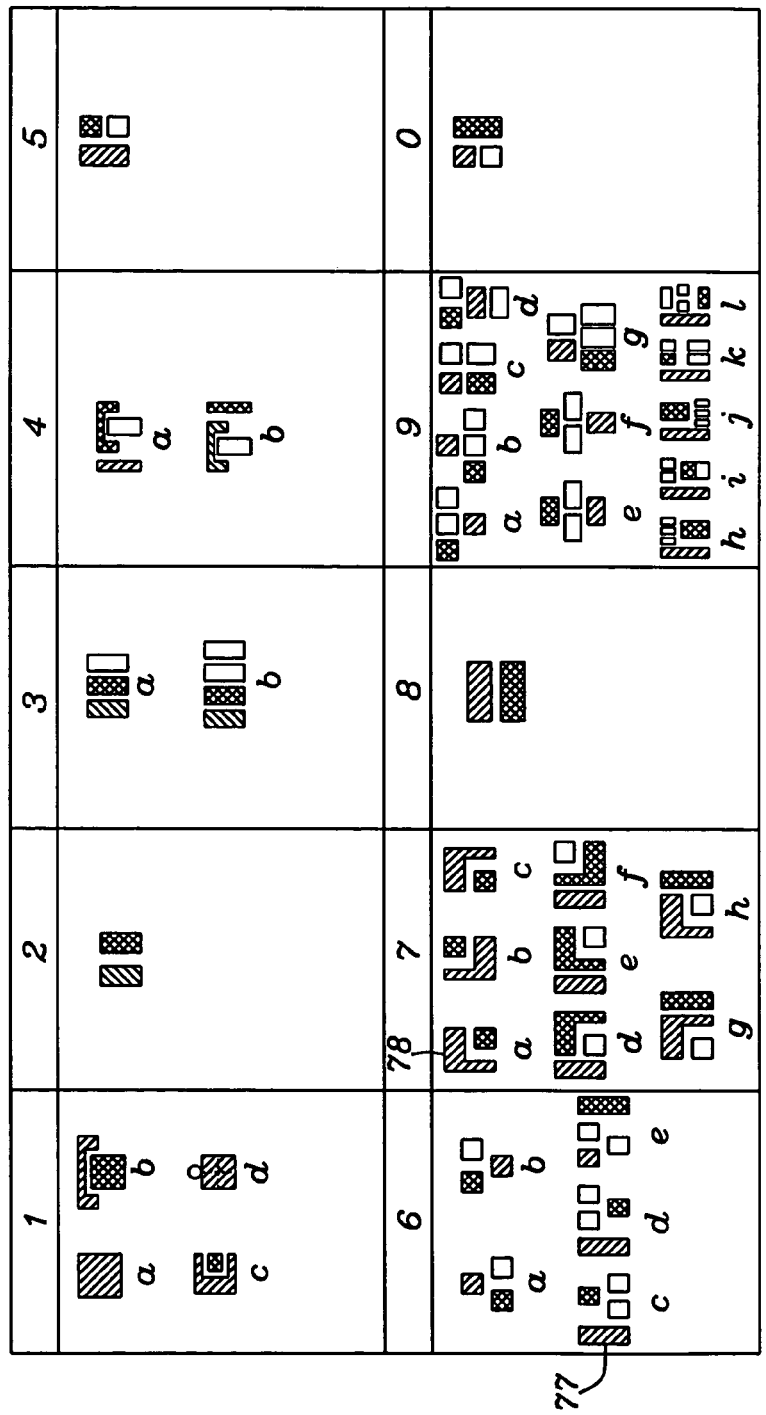
FIG. 6B is a diagram of the present showing examples of the shapes in FIG. 6A to demonstrate parsing of the Chinese character set to obtain unit code decimal digits.

Based on the groupings of character shapes shown in FIG. 6A, selected sets of examples of character shapes are shown in FIG. 6B to demonstrate how the unit code is used. When a user enters one or more two-decimal code digit for unit, the fifth five-star code word, into the LIME editor system, a Chinese word is parsed from the Chinese character set. There are many Chinese characters, at least six thousand in a high school level dictionary (some of which require a two-digit decimal code) and many more beyond that necessitating additional unit code decimal digits.

Referring to FIG. 6B, a first building block 75 is used to create a first unit code digit, and a second building block 76, if required, is used to create a second unit code digit. In group "1" there are two sub-groups 1a and 1b that each yield one unit code digit to retrieve a character, for example 1a could yield the character "一"(single digit unit code word "5") in concert with the previously entered consonant-rhyme-intonation-shape code digits and 1d could yield the character 白(single digit unit code word "4"). In sub-groups 1b and 1c there are two building blocks required, which yield a two-digit unit code resulting in a fifth and a sixth five-star code digit. The two-digit unit code along with the previously entered consonant-rhyme-intonation-shape code digits will yield the desired characters, for example for 1b character 安(unit code digits "5" and "0", yielding unit code word "50") and for 1c character 匹(unit code digits "3" for 匚 and "8" for 儿, yielding unit code word "38"). In group "2" a unit code entered for the left and right vertical elements yields, for example, a character like 双(unit code digits "0" and "0", yielding unit code word "00"). In group "3" there are greater than two vertical elements with two of the vertical elements providing a first 75 and a second 76 building block. Entering a unit code digit for each of the two building blocks for sub-group 3a, for example, can yield the character 川(unit code digits "1" and "1", yielding unit code word "11"), and for sub-group 3b a character like 洲(unit code digit "8" for 氵 entered first and unit code digit "1" for the character 州 on the right with a vertical line in the center entered second, yielding unit code word "81"). In group "4" there are characters with a cover and a left element, subgroup 4a, or a right element, subgroup 4b, which can yield characters, for example, 侷(first unit code digit "1" and second unit code digit "3", yielding unit code word "13") for 4a and for 4b 歐(unit code digit "3" first and then unit code digit "0", yielding unit code word "30"). In group "5" a first digit unit code for the left element and a second digit code for the top right element yields a character in concert with the previously entered initial four digits of the five-star code, for example, character 仁(first unit code digit "1" and second unit code digit "5", yielding unit code word "15").

Continuing to refer to FIG. 6B, in group "6" are grouped the shapes of characters which have upper and lower elements. Entering a first digit of the unit code for the upper element and then entering the second unit code digit for the lower left element of the character of subgroup 6a will produce a Chinese character, for example, 品 meaning "grade". The first unit code digit for the upper element of sub-group 6a defines the first building block 75, for example, a decimal digit "4", which can represent the character 口. The second unit code digit for the lower left element of sub-group 6a defines the second building block 76, for example, a second decimal digit "4" for the character 口, which yields "44" as the unit code for the character 品. In sub-group 6b, entering a unit decimal digit for the lower element and then a unit decimal digit for the upper element can yield a character, for example 單(unit code digits "4" and "4" yielding unit code word "44"),. Sub-groups 6c, 6d and 6e demonstrate the selection of characters that have a by-standing element 77 and upper and lower side elements as shown in 6c, 6d and 6e. Entering a unit code digit for the by-standing element first and a side element second can yield a character, for example, 棍(unit code digit "7" first and then unit code digit "4", yielding a unit code word "74") for sub-group 6c, or 彈(unit code digit "9" and unit code digit "4", yielding unit code word "94") for sub-group 6d. In sub-group 6e the unit code digit for the by-standing element is entered as the second unit code digit, which can yield, for example, for 6e character 鄂(unit code digit "4" and unit code digit "1", yielding unit code word "41").

Continuing to refer to FIG. 6B, in group "7" there are characters with a bent stroke 78 with and without a by-standing element. In sub-groups 7a, 7b, and 7c the bent element is chosen for the first unit digit, which yields, for example, the character for 7a 左(unit code digits "7" and "5", yielding unit code word "75"), for 7b 達(unit code digit "9" for 辶 and unit code digit "2" for 幸, yielding unit code word "92") and for 7c 武(unit code digit "5" and unit code digit "7", yielding unit code word "57"). In subgroups 7d, 7e, and 7f there are a bent stroke 78, a by-standing element 77 and a third element in which the by-standing element is chosen as the first unit building block and the bent element is chosen as the second unit building block. Sub-units 7d, 7e and 7f yield characters, for example for 7d, 拭(unit code digit "1" and unit code digit "7", yielding unit code word "17"), for 7e 擴(unit code digit "1" and unit code digit "2", yielding unit code word "12"), and for 7f 挺(unit code digit "1" for 扌 and unit code digit "9" for 廷, yielding unit code word "19"). In sub-groups 7g and 7h the bent element is the first unit building block and the by-standing element is the second unit building block yielding characters, for example, for 7g 刎(unit code digit "3" for 勿 and unit code digit "1" for 刂 yielding unit code word "31") and for 7h 劇(unit code digit "2" and unit code digit "1", yielding unit code word "21").

Although the unit code word is the same for 7g and 7h, the preceding consonant-rhyme-intonation-shape partial code word for the five-star code identifies the difference in the two resulting characters.

Continuing to refer to FIG. 6B, in group "8" of FIG. 6B is shown a shape having an upper and lower element. The upper element is chosen for the first unit building block, and the lower element is chosen as the second unit building block, which yields a character, for example, character 昌(unit code digit "4" and unit code digit "4", yielding unit code word "44"). In group "9", which is similar to group "6", various building blocks are chosen for the first and second unit building block in the different sub-groups for the first and second unit code digits. The entry of a unit code digit for each of the first and second building blocks in group "9" yields different characters, for example, for sub-group 9a character 樂(unit code digit "0" and unit code digit "0", yielding unit code word "00"), for 9b 贏(unit code digit "5" and unit code digit "3", yielding unit code word "53", for 9c 筋(unit code digit "6" and unit code digit "3", yielding unit code word "63", for 9d 警(unit code digit "5" and unit code digit "2", yielding unit code word "52", for 9e 卒(unit code digit "7" and unit code digit "6", yielding unit code word "76"), for 9f, 賈(unit code digit "2" and unit code digit "6", yielding unit code word "26", for 9g 薇(unit code digit "6" and unit code digit "1", yielding unit code word "61", for 9h 燦(unit code digit "0" for 火and unit code digit "7" for 木, yielding unit code word "07"), for 9i 燈(unit code digit "1" and unit code digit "4", yielding unit code word "14"), for 9j 瀛(unit code digit "0" and unit code digit "6", yielding unit code word "06"), for 9k 澀(unit code digit "0" and unit code digit "6", yielding unit code word "06"), and for 9l 燒(unit code digit "0" for 火and unit code digit "9" for 兀,yielding unit code word "09"). In group "0" is shown a right by-standing element and two elements stacked one on the other to the left of the by-standing element. The upper of the two stacked elements is selected for the first building block, and the by-standing element is selected for the second building block, which yields a character, for example, 次(unit code digit "5" and unit code digit "0", yielding unit code word "50").

The example shown in FIG. 6B demonstrates the power of the five-star code, which provides an efficient method to extract a Chinese character from a table of thousands of Chinese characters. More importantly, the example demonstrates a means for alphabetizing the words of the Chinese language, herein named "The Five-Star Chinese Alphabet" which uses consonant, rhyme, intonation, shape and unit to define the Chinese ideograms in an orderly manner, and allow the methodology and associated rules to be used to digitize centuries of Chinese literature and other works in an orderly fashion that can be retrieved and shared.

There are two modes for Japanese, Hiragana and Katakana, used in the present invention. The number of characters in Hiragana and Katakana are too large to provide in a single character table, and the two Japanese modes are usually used for different words and phrases. There is not a known occasion that a user will need to key in Hiragana for one letter and Katakana for a second letter. Therefore, each Japanese mode is formed with a separate table each having a two-digit index. TABLE 5 shows the digit input keys for Hiragana and TABLE 6 shows the two digit input keys for Katakana.

TABLE 5

| 0 | 9 | 8 | 7 | 6 | 5 | 4 | 3 | 2 | 1 | 1st / 2nd |
|---|---|---|---|---|---|---|---|---|---|---|
| わ | ら | や | ま | は | な | た | さ | か | あ | 1 |
| い | り | い | み | ひ | に | ち | し | き | い | 2 |
| う | る | ゆ | む | ふ | ぬ | つ | す | く | う | 3 |
| え | れ | え | め | へ | ね | て | せ | け | え | 4 |
| を | ろ | よ | も | ほ | の | と | そ | こ | お | 5 |
|   |   | ゃ |   | ば | ぱ | だ | ざ | が |   | 6 |
|   |   |   |   | び | ぴ | ぢ | じ | ぎ |   | 7 |
|   |   | ゅ |   | ぶ | ぷ | づ | ず | ぐ |   | 8 |
| ん |   |   |   | べ | ぺ | で | ぜ | げ |   | 9 |
| space |  | ょ |  | ぼ | ぽ | ど | ぞ | ご |   | 0 |

TABLE 6

| 0 | 9 | 8 | 7 | 6 | 5 | 4 | 3 | 2 | 1 | 1st / 2nd |
|---|---|---|---|---|---|---|---|---|---|---|
| ワ | ラ | ヤ | マ | ハ | ナ | タ | サ | カ | ア | 1 |
| イ | リ | イ | ミ | ヒ | ニ | チ | シ | キ | イ | 2 |
| ウ | ル | ユ | ム | フ | ヌ | ツ | ス | ク | ウ | 3 |
| エ | レ | エ | メ | ヘ | ネ | テ | セ | ケ | エ | 4 |
| ヲ | ロ | ヨ | モ | ホ | ノ | ト | ソ | コ | オ | 5 |
|   |   | ャ |   | バ | パ | ダ | ザ | ガ | ァ | 6 |
|   |   |   |   | ビ | ピ | ヂ | ジ | ギ | ィ | 7 |
|   |   | ュ |   | ブ | プ | ヅ | ズ | グ | ゥ | 8 |
| ン |   |   |   | ベ | ペ | デ | ゼ | ゲ | ェ | 9 |
| space |   | ョ |   | ボ | ポ | ド | ゾ | ゴ | ォ | 0 |

A language mode JH is selected to select Hiragana characters when using electronic device with a LIME editor. The Hiragana characters are found by entering a two-digit number corresponding to the columns and rows shown in TABLE 5. The first digit is the column number and the second digit is the row number. Similarly, Katakana is selected by choosing the JK language mode and then entering a two-digit number to select a character. As with the Hiragana shown in TABLE 5, the Katakana characters are selected with a first digit of the two-digit code representing the column in which a character is located and the second digit selects the row.

When Japanese Kanji is to be entered, the Hiragana two-digit code is entered similar to the first three digits (consonant-rhyme-intonation) of the five-star code, and then the Kanji is found using an additional two-digit code for shape and unit similar to that used for the Chinese five-star code. The Hiragana character set shown in TABLE 5 provides a pointer to the Kanji character set where shape as shown in FIG. 6 and unit as shown in TABLE 4 is used select a Kanji character.

Korean words (characters) are classified into two categories, Hanja and Hangul. FIG. 7 shows a table 80 for entry of the Korean Hangul. The Hangul table is structured similar to the AHOW tables of FIGS. 5A and 5B and is used by the Lime editor system. A first decimal number 60 ranging from "0" to "9" selects a row in the Hangul table and a second decimal number 61 ranging from "0" to "9" selects a column in the Hangul table. The Hangul table comprises three grout of sounds: initial and final sounds 81, middle sounds 83 comprising vowels and special final sounds 82 that are constants, which are in addition to the initial and final sounds 81. The Initial and final sounds are further categorized into normal sounds displayed on row 1 of the table in FIG. 7, aspirated sounds on row 2 and glottal sounds displayed on row 3. The initial and final sounds 81 comprise consonants similar to English, and the middle sounds comprise vowels similar to English. The Hangul word is entered into an electronic device by selecting three two-digit codes, for example; code keys "1" and "2" to produce "ㅁ"(m), code keys "1" and "6" to produce "ㅏ"(a), code keys "1" and "4" to produce "ㄴ"(n) and producing a final character "만"(man).

Similar to Kanji and Katakana for the Japanese language, a user of the Korean language can switch between Hanja and Hangul language modes. The Hanja characters are created by first selecting the Hangul mode (KG) and entering the three decimal code numbers for Hangul table. Then the Hanja mode is selected (KJ) and a shape code and a unit code are entered similar to the method used for Kanji.

FIG. 8 shows a method of entering text using the LIME (Multi-Lingual Input Method Editor) to input text of languages comprising Chinese, Japanese, Korean, English and Greek using a small numerical keypad into an electronic device such as a mobile phone and a PC. A language mode is selected 90 by pressing the "*" key on the numerical keypad of the electronic device a number of times until the desired mode is shown on the mode indicator on the text window. A code digit is entered 91 to select a portion of the code necessary to produce the language character that is wanted. If assistance is needed in selecting the code digit 92 the "#" key on the keypad is pressed that displays a review window 94 from which the user can select the code portion by selecting a character from a group of characters 95 by moving the cursor under the desired character and choosing "select" on the electronic device. If the last code digit has not been entered 96, the next code digit is entered 91. If assistance is not required 93 and the last code digit has not been entered 96, the next code digit is entered. If the last code digit has been entered 97, the code word is selected 98 by pressing the select button on the electronic device and the selected language character, or ideogram, is displayed 99 on the text window of the electronic device. If another character of the same language mode is required 100, a code digit is entered on the numerical keypad 91 and steps 92 through 99 are repeated for the next character. If another character of the same language mode is not required 101 and a character from another language mode is required 102, then the language mode is selected and steps 91 through 101 are repeated. If another language mode is not required 103, the process is ended.

A method for entering English characters is shown in FIG. 9 using a number keypad on an electronic device. The English mode is selected 100 by pressing the "*" key on the numerical keypad of the electronic device a number of times until the mode indictor shows English as the selected mode.

A first AHOW code digit is entered 111 selecting a column in the AHOW character table. A second AHOW code digit is entered 112 selecting a row in the AHOW character table. After the second AHOW code digit is entered, the English character is selected 113 by pressing the "select" button on the electronic device, which then displays the selected English character on the text display screen. At anytime the user can select the review window for assistance in selecting the desired English character.

Figures 10, 11:
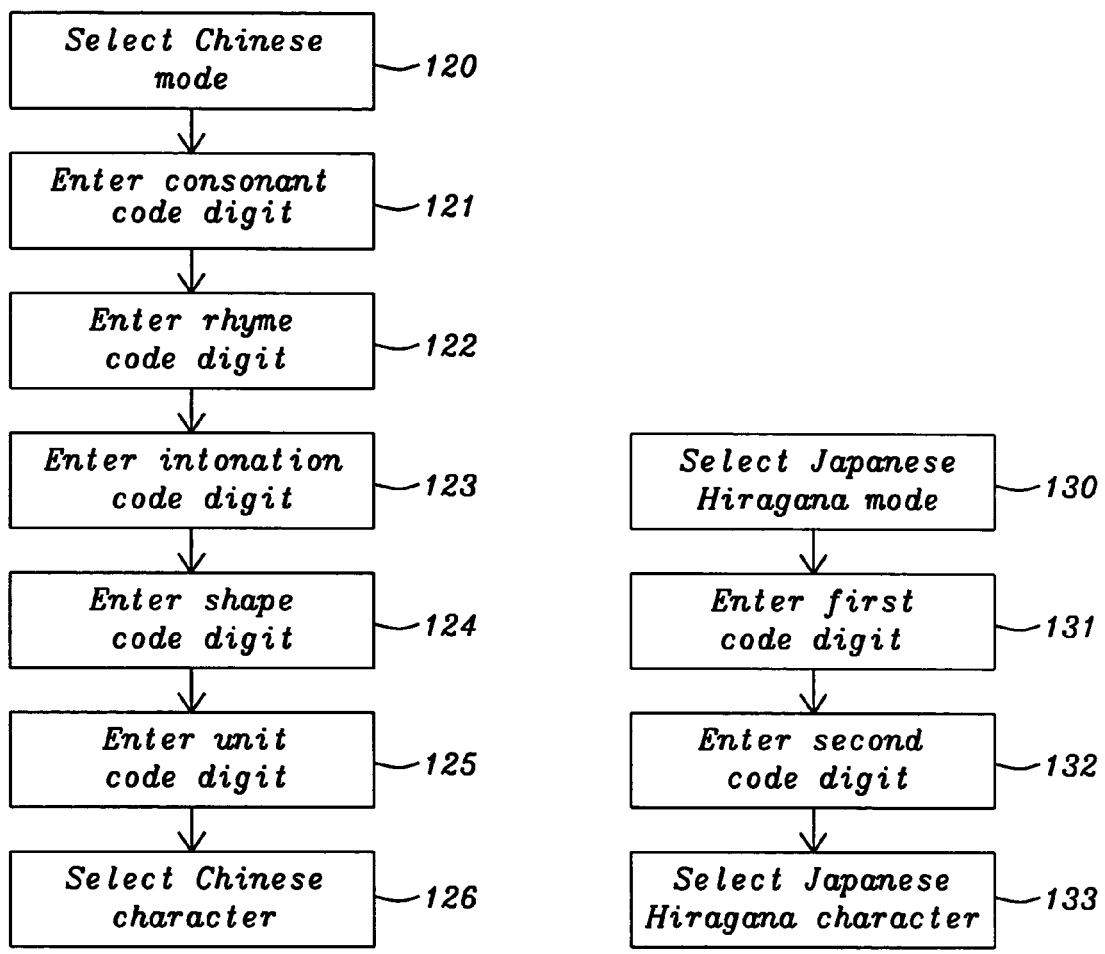
FIG. 10 is a flow diagram of a method of the present invention for entering Chinese characters.
FIG. 11 is a flow diagram of a method of the present invention for selecting a Japanese Hiragana character.

A method for entering Chinese characters is shown in FIG. 10 using a number keypad on an electronic device. The Chinese mode is selected 120 by pressing the "*" key on the numerical keypad of the electronic device. A first digit representing "consonant" of the five-digit five-star code for Chinese characters is entered 121 using the number keypad of the electronic device as noted in TABLE 1. A second digit representing "rhyme" is entered 122 using the number keypad as noted in TABLE 2, and a third digit representing "intonation" is entered 123 into the electronic device as noted in TABLE 3. A fourth digit of the five-star code representing "shape" is entered 124 by selecting the shape category noted in FIG. 6, and a fifth code of the five-star code comprising one or more digits is entered 125 for "unit" as noted in TABLE 4. After entering the four decimal digits plus the additional digits for "unit" of the five-star code, the Chinese character represented by the five-star code is selected 126 by pressing the select button on the electronic device and displaying the selected Chinese character on the text screen of the electronic device. At any point in creating the five-star code, the user can select the review window for visual assistance by pressing the review key "#". It should be noted that, although consonant, rhyme, intonation and shape are each defined herein as a code element comprising a single decimal code digit, it is within the scope of the present invention that any or all of these code elements can each contain a plurality of decimal code digits.

In FIG. 11 is shown the method of selecting a Japanese Hiragana character. The Japanese Hiragana mode is selected 130 by pressing the "*" key on the numerical keypad of the electronic device. A first code digit is entered 131 that selects a column of the Hiragana character table shown in TABLE 5, and a second code digit is entered 132 that selects the row of the containing the Hiragana character. After the two-Hiragana code digits are entered, the Hiragana character is selected 134 by pressing the select button on the electronic device after the second Hiragana code digit is entered, which then displays the selected character on the text window. The "#" review key can be selected to visually assist the user in creating the Hiragana two-digit decimal code when in the Hiragana mode.

Figure 12:
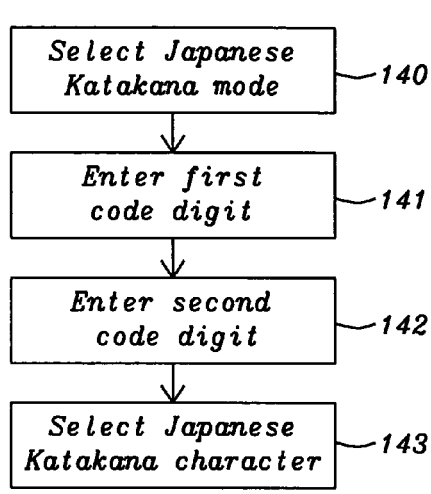
FIG. 12 is a flow diagram of a method of the present invention for selecting a Japanese Katakana character.

In FIG. 12 is shown the method of selecting a Japanese Katakana character. The Japanese Katakana mode is selected 140 by pressing the "*" key on the numerical keypad of the electronic device. A first code digit is entered 141 that selects a column of the Katakana character table shown in TABLE 6, and a second code digit is entered 142 that selects the row of the containing the Katakana character. After the two-Katakana code digits are entered, the Katakana character is selected 143 by pressing the select button on the electronic device after the second Katakana code digit is entered, which then displays the selected character on the text window. The "#" review key can be selected at any time to visually assist the user in creating the Katakana two-digit decimal code when in the Katakana mode.

Figure 13:
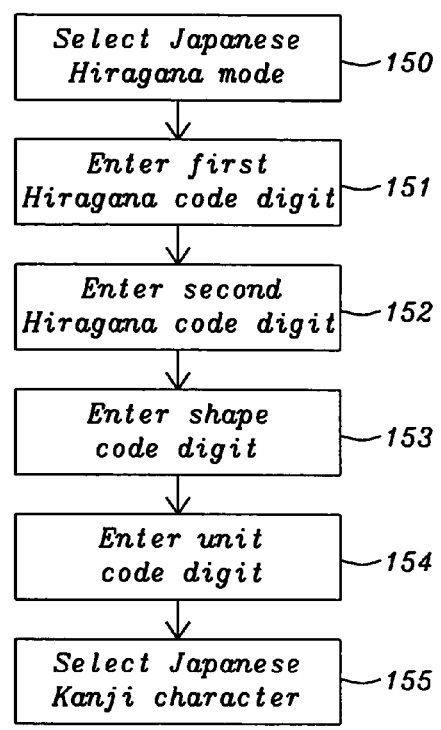
FIG. 13 is a flow diagram of a method of the present invention for selecting a Japanese Kanji character.

In FIG. 13 is shown the method of selecting a Japanese Kanji character. The Japanese Hiragana mode is selected 150 by pressing the "*" key on the numerical keypad of the electronic device. A first code digit is entered 151 that selects a column of the Hiragana character table shown in TABLE 5, and a second code digit is entered 152 that selects the row of the containing the Hiragana character. After the two-Hiragana code digits are entered, a third digit is entered to select "shape" 153 as shown in FIG. 6, and a fourth code comprising one or more digits is entered to select "unit" 154 as shown in TABLE 4, which results in selecting a Kanji character. The Kanji character is selected 155 by pressing the select button on the electronic device after the fourth Kanji code digit is entered, which then displays the selected Kanji character on the text window. The "#" review key can be selected at any time to visually assist the user in creating the Kanji four-digit decimal code.

Figure 14:
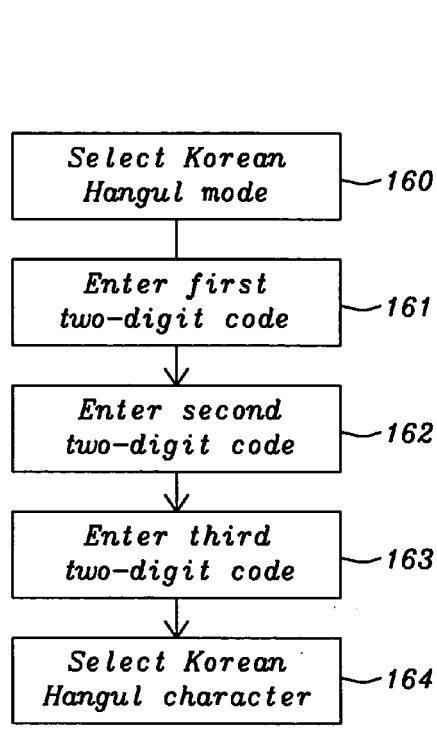
FIG. 14 is a flow diagram of a method of the present invention for selecting a Korean Hangul character.

In FIG. 14 is a flow diagram for entry of Korean Hangul characters into an electronic device using a ten-digit decimal keypad. The Korean Hangul mode is selected 160 by pressing the "*" key on the numerical keypad of the electronic device. A first two-digit decimal code is entered into the electronic device 161 to select an initial word sound. Then a second two-digit decimal code is entered 162 to select middle sounds of the word comprising vowels, and a third two-digit decimal code is entered 163 to select the final sound of the word. After the three two-digit codes are entered, the Hangul character is selected 164 by pressing the select button on the electronic device after the third two-digit code is entered, which then displays the selected character on the text window. The "#" review key can be selected at any time to visually assist the user in creating the Hangul three two-digit decimal code when in the Hangul mode.

Figure 15:
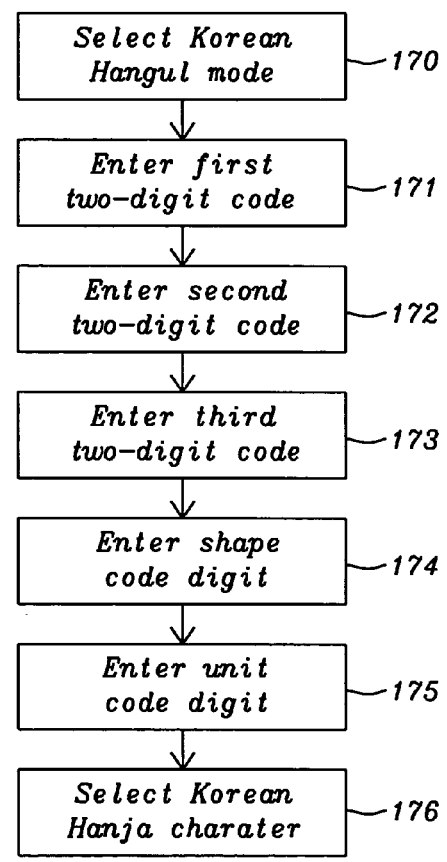
FIG. 15 is a flow diagram of a method of the present invention for selecting a Korean Hanja character.

In FIG. 15 is a flow diagram for entry of Korean Hanja characters into an electronic device using a ten-digit decimal keypad. The Korean Hangul mode is selected 170 by pressing the "*" key on the numerical keypad of the electronic device. A first two-digit decimal code is entered into the electronic device 171 to select an initial word sound. Then a second two-digit decimal code is entered 172 to select middle sounds of the word comprising vowels, and a third two-digit decimal code is entered 173 to select the final sound of the word. After the three two-digit Hangul code is entered, a first one-digit code is entered to select "shape" 174 as shown in FIG. 6, and a second code comprising one or more digits is entered to select "unit" 175 as shown in TABLE 4, which results in selecting a Korean Hanja character. The Hanja character is selected 176 by pressing the select button on the electronic device after the fifth code digit is entered, which then displays the selected Hanja character on the text window. The "#" review key can be selected at any time to visually assist the user in creating the Hangul three two-digit decimal code, the one-digit decimal code for shape and the one or more digit code for unit, which selects the Hanja character.

Whereas, the coding of the code word for constant, rhyme, intonation, shape and unit for Asian languages and the AHOW character tables for non-Asian languages of the present invention has been discussed with respect to decimal code digits to accommodate a ten digit decimal keypad, any form of coding comprising fixed, binary, octadecimal, hexadecimal and any encoding thereof is within the scope of the present invention for use with any apparatus, electronic device or equipment that is using or applying Asian and/or non-Asian characters in the operation of the apparatus, electronic device or equipment. It should also be noted that the consonant, rhyme, intonation, shape and unit sequence and any derivative thereof, creates an arrangement for Asian language ideograms, words, phrases and/or characters that form an Asian alphabetizing, indexing and displaying order in similar fashion to a non-Asian language alphabetizing, indexing and displaying of words, phrases and/or characters.

While the invention has been particularly shown and described with reference to preferred embodiments thereof, it will be understood by those skilled in the art that various changes in form and details may be made without departing from the spirit and scope of the invention.

What is claimed is:

1. A system for multiple language input into an electronic device, comprising:
   a) an electronic device with an embedded operating system (OS), a general user interface (GUI) a numerical keypad, control keys and a display screen;
   b) a character pattern data base with an index to allow access to character patterns contained within said character pattern database, the character pattern data base comprising Chinese Characters;
   c) a language input editor;
   d) a user application; and
   e) said user application accesses said character pattern data base through said language input editor using the numerical keypad and control keys to display a selected language character on said display screen; wherein said Chinese characters are accessed with a five digit decimal code; wherein said five digit decimal code further comprises:
      a) a first digit for defining a consonant of said Chinese characters;
      b) a second digit defining a rhyme of said Chinese characters;
      c) a third digit defining an intonation of said Chinese characters; and
      d) a fourth digit defining a shape of said Chinese characters.

2. The system of claim 1, wherein said electronic device is a mobile phone.

3. The system of claim 1, wherein said electronic device is a personal data assistant having at least a virtual numerical keypad.

4. The system of claim 1, wherein said electronic device is a personal computer or a larger computing system comprising a mainframe, a server and a supercomputer.

5. The system of claim 1, wherein said control keys comprise a language mode key that allows characters from a plurality of languages to be interspersed in a line of text by selecting a different language at any position of a text cursor.

6. The system of claim 1, wherein said five digit decimal code further comprises a fifth digit defining a unit of said Chinese characters.

7. The system of claim 1, wherein said five decimal code further comprises a two-digit decimal word defining a unit of said Chinese characters.

8. The system of claim 7, wherein said unit of the Chinese characters comprises said decimal word containing one or more decimal digits.

9. The system of claim 1, wherein said language editor provides a visual image of said Chinese characters associated with any one digit of said five digit decimal code to allow a user to select an appropriate code number to input into said electronic device.

10. The system of claim 1, wherein said language input editor provides a text window to display characters that have been chosen and a first control key to select an input window to display digits of a decimal code that is being entered with a second control key that allows a review window to be accessed to allow visual selection of a character that is associated with a position of a cursor location in the input window.

11. The system of claim 1, wherein said application is text messaging using a mobile phone.

12. The system of claim 11, wherein said text messaging is multilingual.

13. The system of claim 1, wherein said application is a text entry into a personal data assistant.

14. The system of claim 13, wherein said text entry is multilingual.

15. The system of claim 1, wherein said application is a text entry into a personal computer.

16. The system of claim 15, wherein said text entry is multilingual.

17. The system of claim 1, wherein said application is a multilingual text entry into said electronic device.

* * * * *